United States Patent
Wang et al.

(10) Patent No.: US 10,536,563 B2
(45) Date of Patent: Jan. 14, 2020

(54) PACKET HANDLING BASED ON VIRTUAL NETWORK CONFIGURATION INFORMATION IN SOFTWARE-DEFINED NETWORKING (SDN) ENVIRONMENTS

(71) Applicant: Nicira, Inc., Palo Alto, CA (US)

(72) Inventors: Yusheng Wang, Beijing (CN); Donghai Han, Beijing (CN)

(73) Assignee: NICIRA, INC., Palo Alto, CA (US)

(*) Notice: Subject to any disclaimer, the term of this patent is extended or adjusted under 35 U.S.C. 154(b) by 0 days.

(21) Appl. No.: 15/889,224

(22) Filed: Feb. 6, 2018

(65) Prior Publication Data

US 2019/0245949 A1 Aug. 8, 2019

(51) Int. Cl.
*H04L 29/06* (2006.01)
*H04L 12/46* (2006.01)
*H04L 12/24* (2006.01)

(52) U.S. Cl.
CPC .......... *H04L 69/22* (2013.01); *H04L 12/4641* (2013.01); *H04L 41/0803* (2013.01); *H04L 2212/00* (2013.01)

(58) Field of Classification Search
None
See application file for complete search history.

(56) References Cited

U.S. PATENT DOCUMENTS

| | | | | |
|---|---|---|---|---|
| 2012/0246637 A1* | 9/2012 | Kreeger | .............. | H04L 67/1038 718/1 |
| 2014/0092907 A1* | 4/2014 | Sridhar | .................. | H04L 45/74 370/392 |
| 2014/0351812 A1* | 11/2014 | Imai | ..................... | G06F 9/45533 718/1 |
| 2015/0036538 A1* | 2/2015 | Masuda | .................. | H04L 45/38 370/254 |
| 2015/0103839 A1* | 4/2015 | Chandrashekhar | ... | H04L 45/741 370/401 |
| 2015/0378760 A1* | 12/2015 | Su | ........................ | G06F 9/45558 718/1 |
| 2016/0182382 A1* | 6/2016 | Singaravelu | ............ | H04L 67/16 709/223 |

(Continued)

OTHER PUBLICATIONS

Ravello Community, "Cloud Networking: Layer 2 Access in Amazon EC2", Oracle, Apr. 2, 2014.

(Continued)

*Primary Examiner* — Candal Elpenord
(74) *Attorney, Agent, or Firm* — SU IP Consulting

(57) ABSTRACT

Example methods are provided for packet handling based on virtual network configuration information in a software-defined networking (SDN) environment. An example comprises a first host obtaining virtual network configuration information that specifies a first virtual object identifier (ID) and a first address associated with a first virtualized computing instance, and a second virtual object ID and a second address associated with a second virtualized computing instance. In response to detecting an egress packet with an inner header that is addressed from the first address to the second address, the first host may generate an encapsulated packet by encapsulating the egress packet with an outer header that specifies the second virtual object ID; and send the encapsulated packet to the second host to cause the second host to decapsulate the outer header and, based on the second virtual object ID, send the egress packet to the second virtualized computing instance.

18 Claims, 10 Drawing Sheets

(56) References Cited

U.S. PATENT DOCUMENTS

2016/0299775 A1* 10/2016 Madapurath ........ G06F 9/45558
2017/0237655 A1*  8/2017 Yang ................... H04L 12/4633
                                                       370/254
2018/0006878 A1*  1/2018 Raman .................... H04L 41/22

* cited by examiner

Virtual network configuration information 400

| 401 Tenant_ID | 402 VNIC_Name | 403 VNIC_ID | 404 MAC Address | 405 IP Address | 406 Domain Name (DN) | 407 Hypervisor_ID | 408 NAT Type | 409 IP_Ext (External IP) | 410 IP_GW IP_DNS | |
|---|---|---|---|---|---|---|---|---|---|---|
| T1 | VNIC1 | 101 | MAC-1 (01:...:01) | IP-1 (10.1.1.5) | dn1.xyz.com | Hypervisor-A (IP-A) | SNAT | | IP-GW1 IP-S | ← 421[#1] |
| T2 | VNIC2 | 102 | MAC-2 (01:...:02) | IP-2 (12.1.1.1) | | Hypervisor-A (IP-A) | DNAT | 160.1.2.10 | IP-GW2 IP-S | ← 422[#2] |
| T1 | VNIC3 | 103 | MAC-3 (01:...:03) | IP-3 (10.1.1.6) | | Hypervisor-B (IP-B) | NONE | | IP-GW1 IP-S | ← 423[#1] |
| T1 | VNIC4 | 104 | MAC-4 (01:...:04) | IP-4 (160.1.2.5) | | NULL | DIRECT | | IP-GW3 IP-S | ← 424[#3] |
| T1 | VNIC5 | 105 | MAC-5 (01:...:05) | IP-5 (12.1.1.2) | dn2.xyz.com | Hypervisor-C (IP-C) | DNAT | 160.1.2.3 | IP-GW2 IP-S | ← 425[#1] |
| T2 | VNIC6 | 106 | MAC-6 (01:...:06) | IP-6 (10.1.1.7) | | Hypervisor-C (IP-C) | SNAT | | IP-GW1 IP-S | ← 426[#2] |

[#1] *Sent to target hosts 110A-C associated with Tenant_ID = T1 and gateway(s)*
[#2] *Sent to target hosts 110A and 110C associated with Tenant_ID = T2 and gateway(s)*
[#3] *Not distributed because Hypervisor_ID = NULL (i.e., not activated)*

Fig. 4

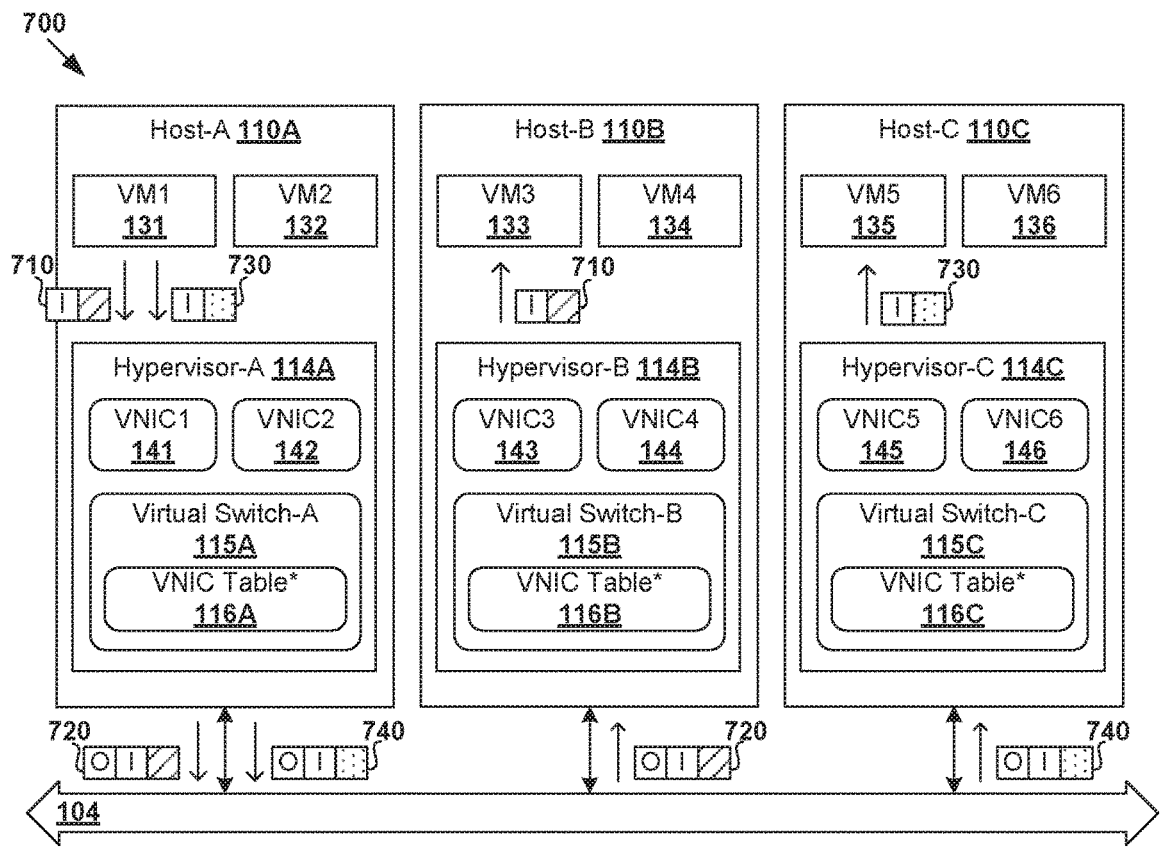
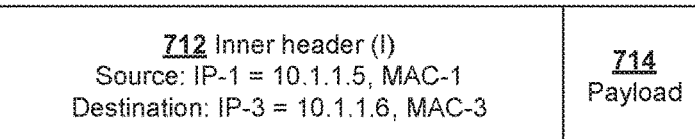
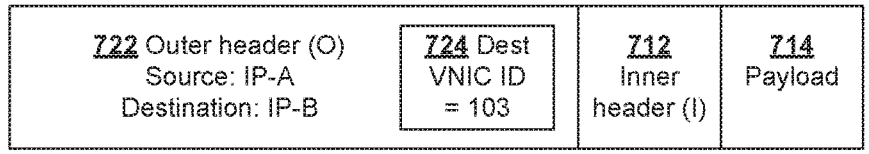
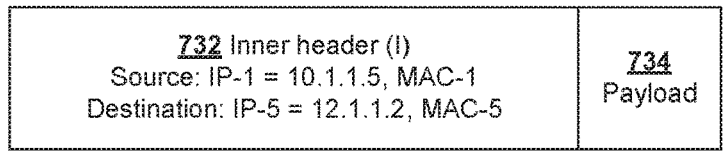
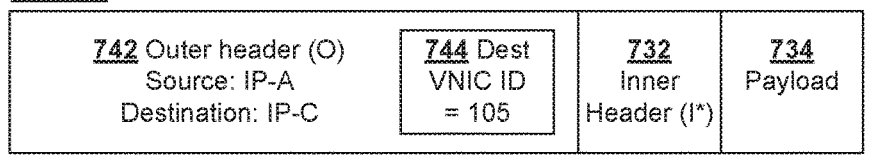
Fig. 7

PACKET HANDLING BASED ON VIRTUAL NETWORK CONFIGURATION INFORMATION IN SOFTWARE-DEFINED NETWORKING (SDN) ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. Through SDN, benefits similar to server virtualization may be derived for networking services. For example, virtual networks that are decoupled from the underlying physical network infrastructure may be configured. While SDN environments provide numerous advantages over hard coding physical network infrastructure, in many cases, users may prefer a simpler networking model.

BRIEF DESCRIPTION OF DRAWINGS

FIG. 4 is a schematic diagram illustrating example virtual network configuration information in an SDN environment;

FIG. 7 is a schematic diagram illustrating an example packet handling based on virtual network configuration information according to the example in FIG. 5;

DETAILED DESCRIPTION

Figure 1:
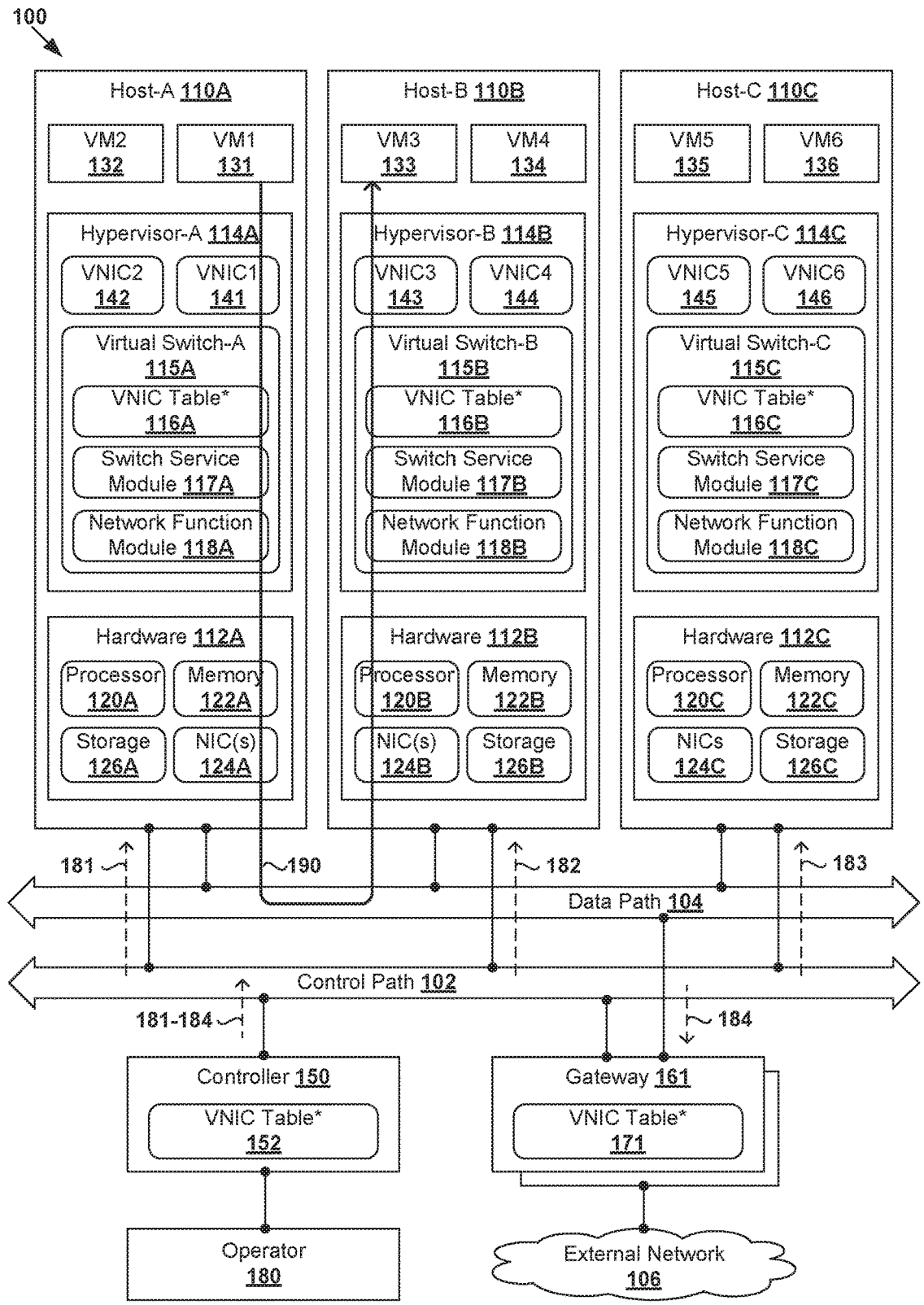
FIG. 1 is a schematic diagram illustrating an example software-defined networking (SDN) environment in which packet handling based on virtual network configuration information may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to virtual network configuration and packet handling in software-defined networking (SDN) environments will now be explained in more detail using FIG. 1, which is a schematic diagram illustrating example SDN environment 100 in which packet handling based on virtual network configuration may be performed. It should be understood that, depending on the desired implementation, SDN environment 100 may include additional and/or alternative components than that shown in FIG. 1.

In the example in FIG. 1, SDN environment 100 includes multiple hosts, such as host-A 110A, host-B 110B and host-C 110C that are inter-connected via data path 104 provided by an underlying physical network. Each host 110A/110B/110C includes suitable hardware 112A/112B/112C and virtualization software (e.g., hypervisor-A 114A, hypervisor-B 114B, hypervisor-C 114C) to support various virtualized computing instances, such as virtual machines (VMs) 131-136. For example, host-A 110A supports VM1 131 and VM2 132; host-B 110B supports VM3 133 and VM4 134; and host-C 110C supports VM5 135 and VM6 136. In practice, SDN environment 100 may include any number of hosts (also known as a "computing devices", "host computers", "host devices", "physical servers", "server systems", etc.), where each host may be supporting tens or hundreds of VMs.

Although examples of the present disclosure refer to VMs, it should be understood that a "virtual machine" running on a host is merely one example of a virtualized computing instance or workload. A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software virtualization layer or component that supports the execution of multiple virtualized computing instances, including system-level software in guest VMs that supports namespace containers, etc.

Hypervisor 114A/114B/114C maintains a mapping between underlying hardware 112A/112B/112C and virtual resources allocated to VMs 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 126A/126B/126C, etc. Virtual resources are allocated to each VM to support a guest operating system (OS) and applications. Corresponding to hardware 112A/112B/112C, the virtual resources may include virtual CPU, guest physical memory, virtual disk, virtual network interface controller (VNIC), etc. Hardware resources may be emulated using virtual machine monitors (VMMs; not shown for simplicity), which may be considered as part of corresponding VMs 131-136, or alternatively, separated from VMs 131-136.

In the example in FIG. 1, VNICs 141-146 are emulated by VMMs (not shown for simplicity). Although one-to-one relationships are shown, one VM may be associated with multiple VNICs. In practice, VNICs 141-146 may also be referred to as "network endpoints." Virtual switch 115A/115B/115C maintains forwarding information to forward packets to and from corresponding VMs 131-136. Packets are received from, or sent to, each VM via an associated VNIC. As used herein, the term "virtual switch" may refer generally to a software switch or software implementation of a physical switch. The term "packet" may refer generally to a group of bits that can be transported together from a source to a destination, such as message, segment, datagram, etc. The term "layer-2" may refer generally to a Media Access Control (MAC) layer; and "layer-3" to a network or Internet Protocol (IP) layer in the Open System Interconnection (OSI) model, although the concepts described herein may be used with other networking models.

Network virtualization plays an important role in data center operations. Conventionally, SDN environment 100 generally relies on network virtualization configuration models that are designed based on physical networks. For example, similar to physical switches and physical routers in a physical network, one conventional model involves configuring logical forwarding elements, such as logical switches, logical routers to provide respective logical layer-2 switching and logical layer-3 routing services to VMs 131-136, etc. The logical forwarding elements form virtual network(s) that connect VMs 131-136, but are decoupled from the underlying physical hardware connections.

However, in practice, the configuration and implementation of logical switches and logical routers may be complex. For example, logical switches and logical routers can span multiple hosts 110A-C. To implement logical switches in a distributed manner, virtual switches 115A-C are configured at respective hypervisors 114A-C to collectively implement the logical switches, and represent them internally using forwarding tables maintained by respective virtual switches 115A-C. Further, to implement logical routers such as distributed routers (DRs), it is necessary to configure DR instances at respective hypervisors 114A-C to collectively implement the DRs, and represent them internally using routing tables maintained by the DR instances. When one VM communicates with another VM, packets are forwarded via the relevant logical switch(es) and logical router(s) connecting the VMs.

Packet Handling Based on Virtual Network Configuration Information

According to examples of the present disclosure, an improved network virtualization configuration model may be used in SDN environment 100. In particular, packet handling may be performed in a more efficient manner based on "virtual network configuration information" (to be discussed further below) associated with VMs 131-136 and corresponding VNICs 141-146. This way, the complexity of network virtualization configuration and packet handling may be reduced, as well as the processing burden on hosts 110A-C.

Figure 2:
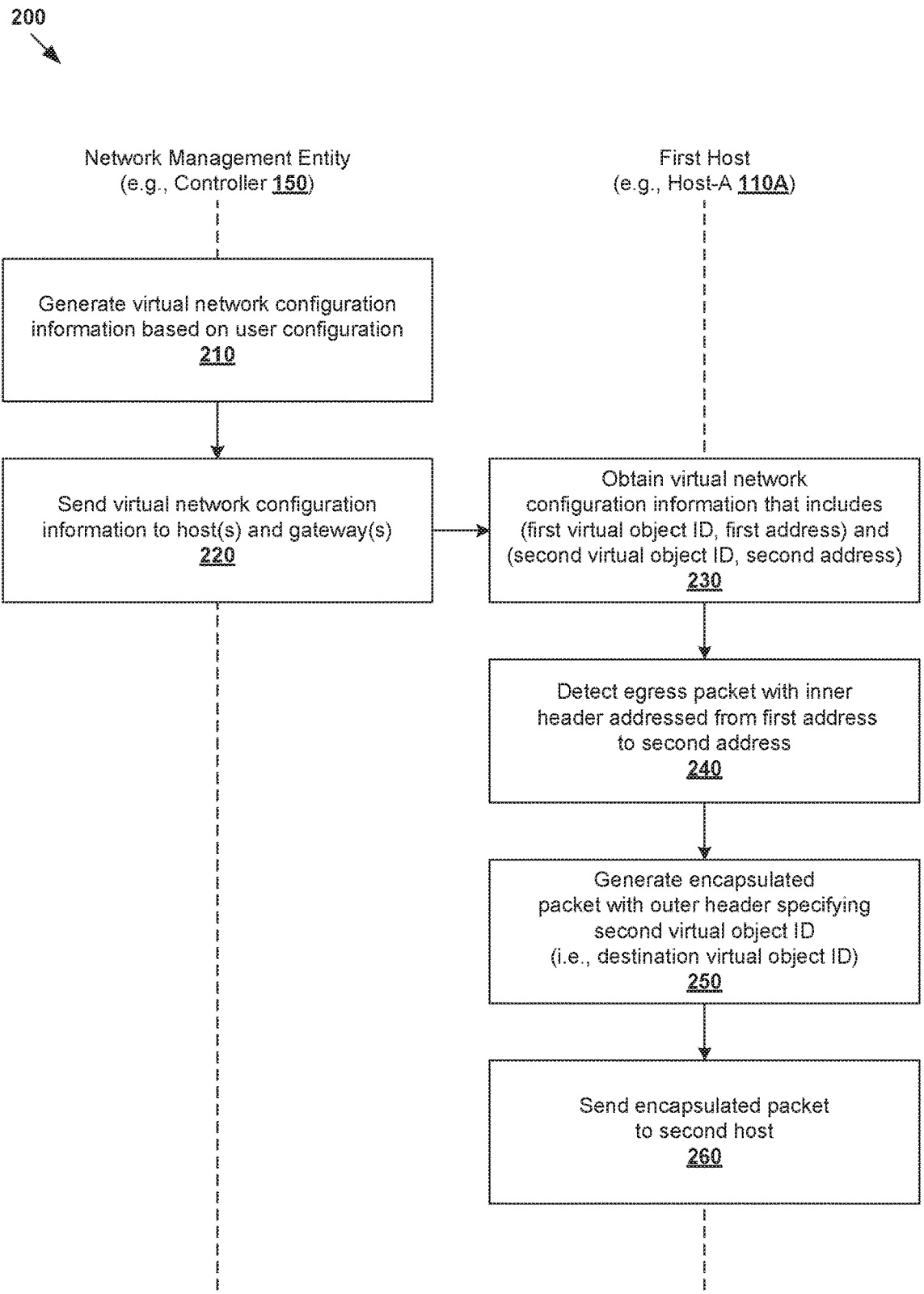
FIG. 2 is a flowchart of an example process for a first host to perform packet handling based on virtual network configuration information in an SDN environment.

In more detail, FIG. 2 is a flowchart of example process 200 for a first host to perform packet handling based on virtual network configuration information in SDN environment 100. Example process 200 may include one or more operations, functions, or actions illustrated by one or more blocks, such as 210 to 260. The various blocks may be combined into fewer blocks, divided into additional blocks, and/or eliminated depending on the desired implementation. It should be noted that the arrow from block 220 to block 230 in FIG. 2 does not necessitate that blocks 230-260 are triggered by block 220. In practice, host 110A/110B/110C may perform packet handling at a later time after the virtual network configuration information is disseminated by controller 150.

Throughout the present disclosure, various examples will be explained using host-A 110A as an example "first host," VM1 131 as "first virtualized computing instance," VNIC1 141 as "first VNIC," first VNIC ID=101 as "first virtual object ID," host-B 110B as example "second host," VM3 133 as "second virtualized computing instance," VNIC3 143 as "second VNIC," second VNIC ID=103 as "second virtual object ID," and controller 150 as "network management entity," and gateway 161. In practice, blocks 210-220 may be implemented using controller 150 or any other suitable "network management entity." Blocks 230-260 may be implemented by host 110A/110B/110C, such as using respective switch service module 117A/117B/117C implemented by virtual switch 115A/115B/115C at hypervisor 114A/114B/114C, etc.

At 210 and 220 in FIG. 2, controller 150 generates and sends virtual network configuration information associated with VMs 131-136 and VNICs 141-146 to hosts 110A-C and a cluster of gateways (e.g., gateway 161). As used herein, the term "virtual network configuration information" (or simply "configuration information") may include any suitable attribute(s) associated with VMs 131-136 and VNICs 141-146 to facilitate packet handling by hosts 110A-C and gateways in SDN environment 100.

As will be discussed using FIG. 3 and FIG. 4, example virtual network configuration information may include any of the following: virtual object identifiers (IDs) assigned by controller 150, IP and/or MAC address information, tenant information, hypervisor information, network address translation (NAT) setting, domain name information, external address information, logical gateway address information, domain name system (DNS) information, any combination thereof, etc. The term "virtual object" may refer generally to a VNIC (e.g., VNIC1 141) associated with a virtualized computing instance (e.g., VM1 131), or the virtualized computing instance itself, etc. The term "virtual object ID" may refer generally to an ID that is assigned by controller 150 to uniquely identify a virtual object within SDN environment 100, such as VNIC IDs, etc.

In the example in FIG. 1, controller 150 sends or disseminates virtual network configuration information to hosts 110A-C (see dashed arrows 181-183), and a cluster of gateways (such as gateway 161; see 184) via control path 102. As will be explained further using FIG. 3 and FIG. 4, the virtual network configuration information may be generated based on configuration requests, such as to add, modify, or delete, activate or deactivate a particular virtual object (e.g., VNIC). The virtual network configuration information may be stored by controller 150 in any suitable data structure, such as VNIC table 152 (e.g., in persisted media). Similarly, hosts 110A-C and gateway 161 may store the virtual network configuration information in respective VNIC tables 116A-C, 171.

At 230 in FIG. 2, host-A 110A obtains virtual network configuration information. Here, the term "obtain" may refer generally to host-A 110A receiving or retrieving the virtual network configuration information from controller 150, storage 126A, any other source, etc. In the example in FIG. 1, the virtual network configuration information (see 181) is obtained from controller 150 and specifies (first VNIC ID=101, first address=IP-1) associated with VM1 131 and VNIC1 141, and (second VNIC ID=103, second address=IP-3) are associated with VM3 133 and VNIC2 142.

At 240 in FIG. 2, host-A 110A detects, from VM1 131 via VNIC1 141, an egress packet with an inner header that is addressed from first address=IP-1 to second address=IP-2 specified in the virtual network configuration information. In response, at 250, host-A 110A generates an encapsulated packet by encapsulating the egress packet with an outer header that specifies second VNIC ID=103 to be a destination VNIC ID. Further, at 260, the encapsulated packet is sent to host-B 110B to cause host-B 110B to decapsulate the outer header and, based on second VNIC ID=103 in the outer header, send the egress packet (i.e., decapsulated packet) to VM3 133 via VNIC3 143 associated with the second VNIC ID. Packet handling based on virtual network configuration information is indicated at 190 in FIG. 1.

In practice, block 250 may include host-A 110A determining whether first address=IP-1 and second address=IP-3 are associated with a same layer-2 network, or different layer-2 networks. If they belong to different layer-2 networks, a packet modification operation may be performed to modify the inner header. Some examples will be described using FIG. 5 and FIG. 7.

The virtual network configuration information may also be used for handling north-south traffic (i.e., from hosts 110A-C to external network 106 and vice versa). As will be discussed using FIG. 8, FIG. 9 and FIG. 10, host-A 110A may obtain virtual network configuration information that associates (first VNIC ID=101, first address=IP-1) with a logical gateway address (e.g., IP-GW1) configured for VNIC1 141 and a network address translation (NAT) operation to be performed by the gateway 161. In practice, the logical gateway address may be defined in a logical domain and represent a logical router interface address. Note that the logical gateway address is not associated with physical gateway 161, whose physical IP address is assumed to be known to hypervisors 114A-C.

In this case, host-A 110A may detect, from VM1 131 via VNIC1 141, a further packet with an outer header that is addressed from first address=IP-1 to a third address (e.g., IP-7) that is not specified in virtual network configuration information. In response, host-A 110A may generate a further encapsulated packet by encapsulating the further packet with an outer header that specifies first VNIC ID=101 to be a source VNIC ID. The further encapsulated packet is then sent to gateway 161 to cause gateway 161 to decapsulate the outer header, perform the NAT operation associated with the first VNIC ID, and forward a decapsulated packet to external network 106.

The virtual network configuration information may also be used for handling ingress packets. For example, host-A 110A may receive, from host-B 110B or gateway 161, an encapsulated packet that includes an outer header specifying first VNIC ID=101. Based on the virtual network configuration information, host-A 110A identifies that first VNIC ID=101 is associated with VNIC1 141. In response, host-A 110A may perform decapsulation to remove the outer header and send a decapsulated packet to VM1 131 via VNIC1 141 based on first VNIC ID=101.

The virtual network configuration information may also be used for handling various network service requests, such as Dynamic Host Configuration Protocol (DHCP) request for address assignment, DNS query for domain name translation, Address Resolution Protocol (ARP) request for address resolution, and ping request using Internet Control Message Protocol (ICMP). As will be discussed using FIG. 5 and FIG. 6, in response to detecting a request for a network service from VNIC1 141, host-A 110A may generate and send a response to VNIC1 141 based on the virtual network configuration information.

According to examples of the present disclosure, packet handling in the east-west direction (among VMs 131-136) and north-south direction (to/from external network 106) may be performed based on the virtual network configuration information. In some examples, virtual switches 115A-C may be configured to perform combined layer-2 and layer-3 packet handling using respective switch service modules 117A-C and virtual network configuration information stored in VNIC tables 116A-C. This reduces, if not removes, the need to configure complex logical switches and/or logical routers to connect VMs 131-136. Further, virtual switches 115A-C may be configured to perform other network functions (e.g., firewall, load balancing) using respective network function modules 118A-C.

Compared to conventional management entities that are deployed over multiple planes such as management plane (MP) and central control plane (CCP), the implementation of controller 150 may be simplified to improve system robustness in SDN environment 100. For example, in some examples, controller 150 may maintain all configuration information in a single table, as well as collect and disperse configuration information to relevant hypervisors and gateways. In practice, VMs 131-136 may also form a logical overlay network using any suitable protocol, such as Virtual eXtensible Local Area Network (VXLAN), Network Virtualization using Generic Routing Encapsulation (NVGRE), Generic Network Virtualization Encapsulation (GENEVE), Stateless Transport Tunneling (STT), etc.

Virtual Network Configuration Information

Blocks 210 and 220 in FIG. 2 will be explained further using FIG. 3, which is a flowchart of example detailed process 300 for a network management entity to generate and send virtual network configuration information in SDN environment 100. Example process 300 may include one or more operations, functions, or actions illustrated at 310 to 370. The various operations, functions or actions may be combined into fewer blocks, divided into additional blocks, and/or eliminated depending on the desired implementation. In the following, various examples will be described using controller 150 as an example "network management entity."

(a) Configuring New VNICs

Figure 3:
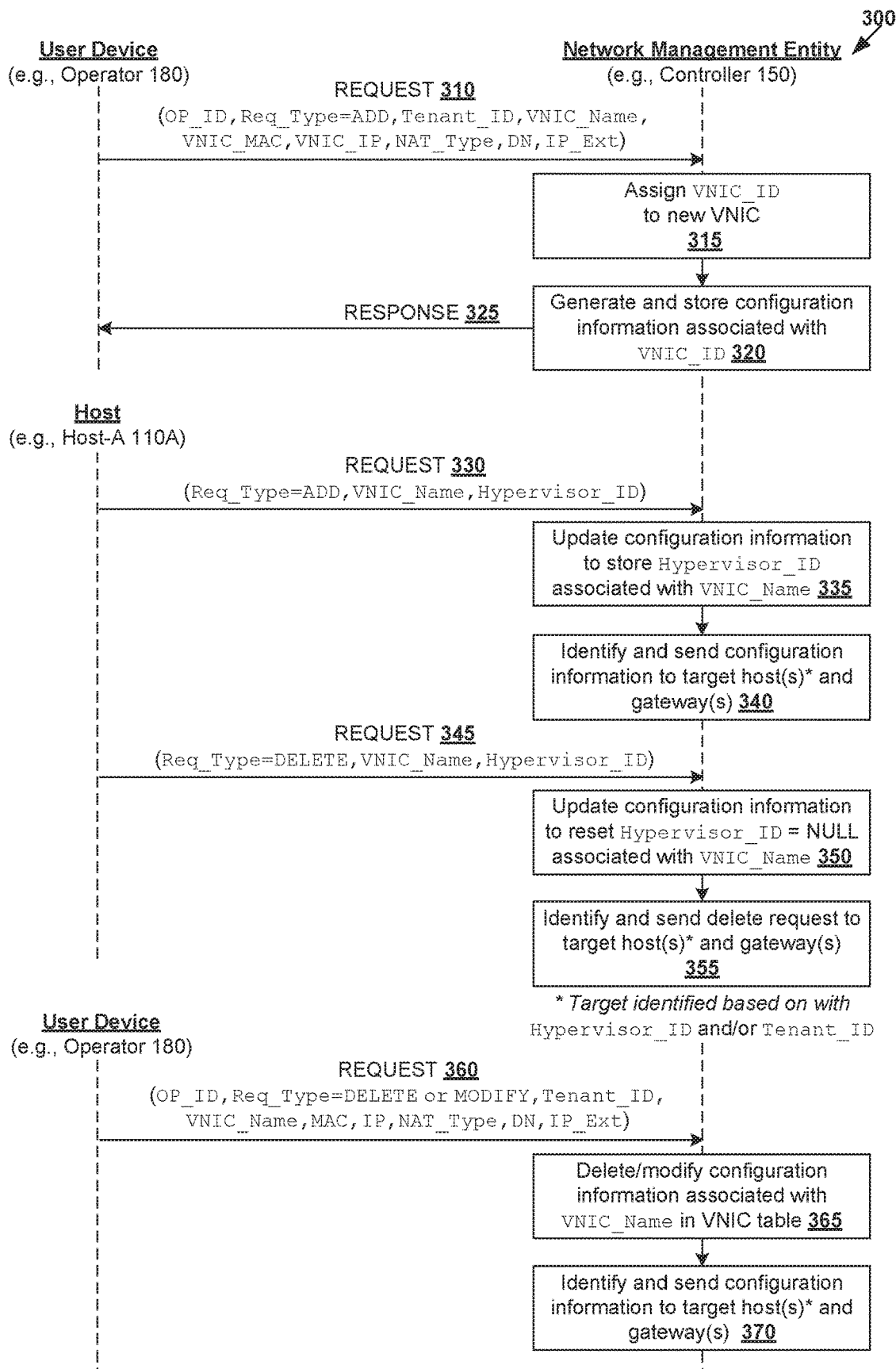
FIG. 3 is a schematic diagram of an example process for a controller to generate and send virtual network configuration information in an SDN environment.

At 310 in FIG. 3, controller 150 receives a configuration request from operator 180 to configure a new VNIC in SDN environment 100. The request may specify an operator ID (denoted OP_ID in Fig.), a request type (Req_Type)=ADD, and any suitable attributes associated with the VNIC, such as name (VNIC_Name), MAC address information (MAC), virtual IP address information (IP), NAT operation (NAT_Type) to be performed by a gateway, etc. Where applicable, the request may further specify a domain name information (DN) and external IP address information (IP_Ext) associated with the VNIC, etc. Depending on the desired implementation, NAT_Type may be DIRECT (i.e., no NAT required), Source NAT (SNAT), Destination NAT (DNAT) or NONE (i.e., external communication is not permitted).

In practice, prior to performing the configuration, controller 150 may determine whether operator 180 (as identified by OP_ID in the request) has the required privilege or permission. For example, multiple privilege levels may be configured, such as "Provider," "Tenant" and "User." An operator with the "Provider" privilege may be permitted to perform all types of configuration. An operator with the "Tenant" privilege may be permitted to perform a subset of the configurations within a particular scope defined by its associated provider. Similarly, an operator with the "User" privilege may perform a subset of configurations within a scope defined by its associated tenant. If the required privilege is not met, controller 150 generates and sends a response indicating that the request has failed.

At 315 and 320 in FIG. 3, in response to determination that operator 180 has the required privilege, controller 150 assigns a VNIC_ID to the new VNIC, and generates and stores configuration information in VNIC table 152 (to be discussed below using FIG. 4). Unlike IP address and/or MAC address that are assigned by operator 180 and generally susceptible to changes and security attacks, VNIC_ID is assigned by controller 150 to ensure unambiguous identification of the VNIC within SDN environment 100 and reduce the likelihood of tampering by malicious third parties. At 325 in FIG. 3, a response is generated and sent to operator 180 to indicate that the request has been successful, or otherwise (e.g., failed when operator 180 does not have the required privilege).

(b) Activating and Deactivating VNICs

Hosts 110A-C may send configuration requests to controller 150 to activate or deactivate a VNIC in response to detecting that its associated VM is powered ON or OFF. For example, when a new VNIC is configured, its Hypervisor_ID is set to NULL. Once the VM is powered ON and its VNIC activated, controller 150 sets Hypervisor_ID to an ID identifying a hypervisor supporting the VM. Once the VM is powered OFF and its VNIC deactivated, controller 150 resets Hypervisor_ID to NULL.

In more detail, at 330 and 335 in FIG. 3, in response to receiving a configuration request to activate a VNIC on a particular hypervisor, controller 150 updates configuration information associated with the VNIC. The request may be received from a host and specify (Req_Type=ADD, VNIC_Name, Hypervisor_ID), where VNIC_Name is associated with the VNIC to be activated and Hypervisor_ID identifies the hypervisor on which the VNIC is activated. Based on the request, controller 150 updates the configuration information associated with VNIC_Name to store Hypervisor_ID.

Some examples are shown in FIG. 4, which is a schematic diagram illustrating example virtual network configuration information 400 in SDN environment 100. In the example in FIG. 4, virtual network configuration information 400 includes various entries 421-426 associated with respective VNICs 141-146. Each entry may specify any suitable attributes, such as Tenant_ID identifying a tenant (see 401), VNIC_Name (see 402), VNIC_ID (see 403), MAC address (see 404), IP address (see 405), domain name (DN; see 406), Hypervisor_ID (see 407), NAT_Type (see 408), IP_Ext (see 409), logical gateway IP address information (IP_GW; see 410), and DNS IP address information (IP_DNS; see 410).

In a first example, virtual network configuration information 421 associated with VNIC1 141 and VM1 131 is generated and stored in response to requests to configure and activate VNIC1 141 on hypervisor-A 114A. Virtual network configuration information 421 specifies (Tenant_ID=T1, VNIC_Name=VNIC1, VNIC_ID=101, MAC=MAC-1, IP=IP-1, DN=dn1.xyz.org, hypervisor_ID=hypervisor-A with IP address=IP-A, NAT_Type=SNAT, IP_Ext=none, IP_GW=IP-GW1, IP_DNS=IP-S).

In a second example, virtual network configuration information 423 is generated and stored in response to requests to configure and activate VNIC3 143 on hypervisor-B 114B. Configuration information 423 specifies (Tenant_ID=T2, VNIC_Name=VNIC3, VNIC_ID=103, MAC=MAC-3, IP=IP-3, DN=none, hypervisor_ID=hypervisor-B with IP address=IP-B, NAT_Type=NONE, IP_GW=IP-GW1, IP_DNS=IP-S).

In a third example, virtual network configuration information 425 is generated and stored in response to requests to configure and activate VNIC5 145 on hypervisor-C 114B. Configuration information 425 associated with VNIC5 145 specifies (Tenant_ID=T1, VNIC_Name=VNIC5, VNIC_ID=105, MAC=MAC-5, IP=IP-5, DN=dn2.xyz.org, hypervisor_ID=hypervisor-C with IP address=IP-C, NAT_Type=DNAT, IP_GW=IP-GW2, IP_DNS=IP-S). For a particular Tenant_ID, an IP address assigned to a VNIC must be unique. However, external IP addresses should be unique across all tenants.

Virtual network configuration information 422, 424, 426 for respective VNICs 142, 144, 146 specifies similar attributes, the explanation of which will not be repeated here for brevity. Note that VNIC4 144 is associated with hypervisor_ID=NULL (see 424/407) because VM4 134 is not powered ON and VNIC4 144 not activated. Each logical gateway IP address (IP_GW) and DNS IP address (IP_DNS) may be configured by controller 150. The logical gateway and DNS IP addresses are reserved and not used for VNIC IP addresses. Controller 150 may configure a virtual DNS server with a predetermined IP address (e.g., IP_DNS) for each tenant in SDN environment 100, such as IPDNS=IP-S for Tenant_ID=T1 and Tenant_ID=T2.

For example, a first logical gateway IP address IP_GW=IP-GW1 may be configured for a first network=10.0.0.0/8 associated with VNIC1 141 and VNIC3 143 based on respective IP addresses IP-1=10.1.1.5, IP-3=10.1.1.6 and IP-6=10.1.1.7 (see 421, 423, 426). A second logical gateway IP address IP_GW=IP-GW2 is configured for a second network=12.1.1.0/8 associated with VNIC2 142 and VNIC5 145 based on respective IP addresses IP-2=12.1.1.1 and IP-5=12.1.1.2 (see 422, 425). A third logical gateway IP address IP_GW=IP-GW3 is configured for a third network=160.1.2.0/24 associated with VNIC4 144 based on IP-4=160.1.2.5.

Referring to FIG. 3 again, at 340, controller 150 identifies target host(s) and gateway(s), and sends virtual network configuration information via control path 102. In general, the virtual network configuration information associated with a particular VNIC may be sent to a target host if the target host either supports the particular VNIC, or a different VNIC that is activated and associated with the same tenant as the target host. It is not necessary for controller 150 to send virtual network configuration information associated with a VNIC that has been configured but not activated (i.e., Hypervisor_ID=NULL).

In a first example, controller 150 identifies that VNIC1 141, VNIC3 143 and VNIC5 145 are associated with Tenant_ID=T1 and activated (see Hypervisor_ID) on respective hypervisor-A 114A, hypervisor-B 114B and hypervisor-C 114C. In this case, controller 150 sends the virtual network configuration information associated with VNIC1 141, VNIC3 143 and VNIC5 145 to target host-A 110A, host-B 110B and host-C 110C. See indication "#1" in FIG. 4 and corresponding entries 421, 423, 425 that will be received by target hosts 110A-C and stored in respective VNIC tables 116A-C.

From the perspective of host-A 110A, it receives virtual network configuration information 421 associated with VNIC1 141 based on controller 150 identifying that VNIC1 141 is activated on hypervisor-A 114A at host-A 110A. Host-A 110A also receives virtual network configuration information 423 associated with VNIC3 143 based on controller 150 identifying that VNIC3 143 is activated on hypervisor-B 114B at host-B 110B, but both VNIC1 141 and VNIC3 143 are associated with the same Tenant_ID=T1. The same applies to virtual network configuration information 425 associated with VNIC5 145. Although VNIC4 144 is also associated with Tenant_ID=T1, its virtual configuration information 424 is not sent to any hypervisor or gateway because VNIC4 144 is not activated (i.e., Hypervisor_ID=NULL).

In a second example, controller 150 identifies that VNIC2 142 and VNIC6 146 are associated with Tenant_ID=T2 and activated on respective hypervisor-A 114A and hypervisor-C 114C. In this case, controller 150 sends the virtual network configuration information associated with respective VNIC2 142 and VNIC6 146 to both target host-A 110A and host-C 110C. See indication "#2" in FIG. 4 and corresponding entries 422, 426 that will be received by target host-A 110A and host-C 110C and stored in respective VNIC tables 116A, 116C.

As such, VNIC table 152 at controller 150 will store all entries 421-426. At host-A 110A, VNIC table 116A stores entries 421, 423, 425 associated with Tenant_ID=T1 and entries 422, 426 associated with Tenant_ID=T2. For the same reason, VNIC table 116C at host-C 110C stores entries 421-423, 425-426. However, at host-B 110B, VNIC table 116B only stores entries 422, 426 associated with Tenant_ID=T1 because host-B 110B does not support any VNIC associated with Tenant_ID=T2. The dissemination of virtual network configuration information from controller 150 to hosts 110A-C is indicated at 181-183 (dashed arrows) in FIG. 1.

At 340 in FIG. 3, controller 150 also identifies gateway(s) to which virtual network configuration information should be sent. For example, gateway 161 is configured to handle north-south traffic for multiple tenants. In this case, controller 150 sends all entries 421, 423, 425 associated with Tenant_ID=T1 and entries 422, 426 associated with Tenant_ID=T2 to gateway 161 for storage in VNIC table 171 and subsequent use during packet handling. The dissemination of virtual network configuration information from controller 150 to gateway 161 is indicated at 184 in FIG. 1. As will be explained further using FIG. 9, the entries may be sent to multiple gateways 161-163 for storage in respective VNIC tables 171-173.

The virtual network configuration information may be updated when a VNIC is deactivated, such as when its corresponding VM is powered OFF. For example, at 345 and 350, in response to receiving a configuration request (Req_Type=DELETE, VNIC_Name=VNIC2, Hypervisor_ID=Hypervisor-A) to deactivate VNIC2 142 on hypervisor-A 114A, controller 150 updates entry 422 in VNIC table 152 to reset Hypervisor_ID=NULL. At 355, controller 150 identifies target host(s) and gateway(s) to which a delete request is sent. Similarly, host-A 110A is a target host based on Hypervisor_ID=hypervisor-A associated with VNIC2 142. Further, based on Tenant_ID=T2 associated with VNIC2 142, host-C 110C is also a target host because VNIC6 146 supported by hypervisor-C 114C belongs to the same tenant. Upon receiving the delete request, hypervisor-A 114A and hypervisor-C 114C delete entry 422 from respective VNIC tables 116A, 116C. The delete request will also sent to gateways 161-163, which delete entry 422 from respective VNIC tables 171-173.

(c) Modifying or Deleting VNICs

VNICs 141-146 may be modified or deleted according to 360 to 370 in FIG. 3. At 360 and 365, in response to receiving a request to modify or delete VNIC2 142, controller 150 updates (i.e., Req_Type=MODIFY) or removes (i.e., Req_Type=DELETE) its associated entry 422 from VNIC table 152. In each scenario, at 370, controller 150 identifies target host(s) and gateway(s) and instructs them to update their respective VNIC tables accordingly. The target host(s) and gateway(s) may be identified using the approach at blocks 340 and 355 and will not be repeated here for brevity.

Network Service Packet Handling

Figure 5:
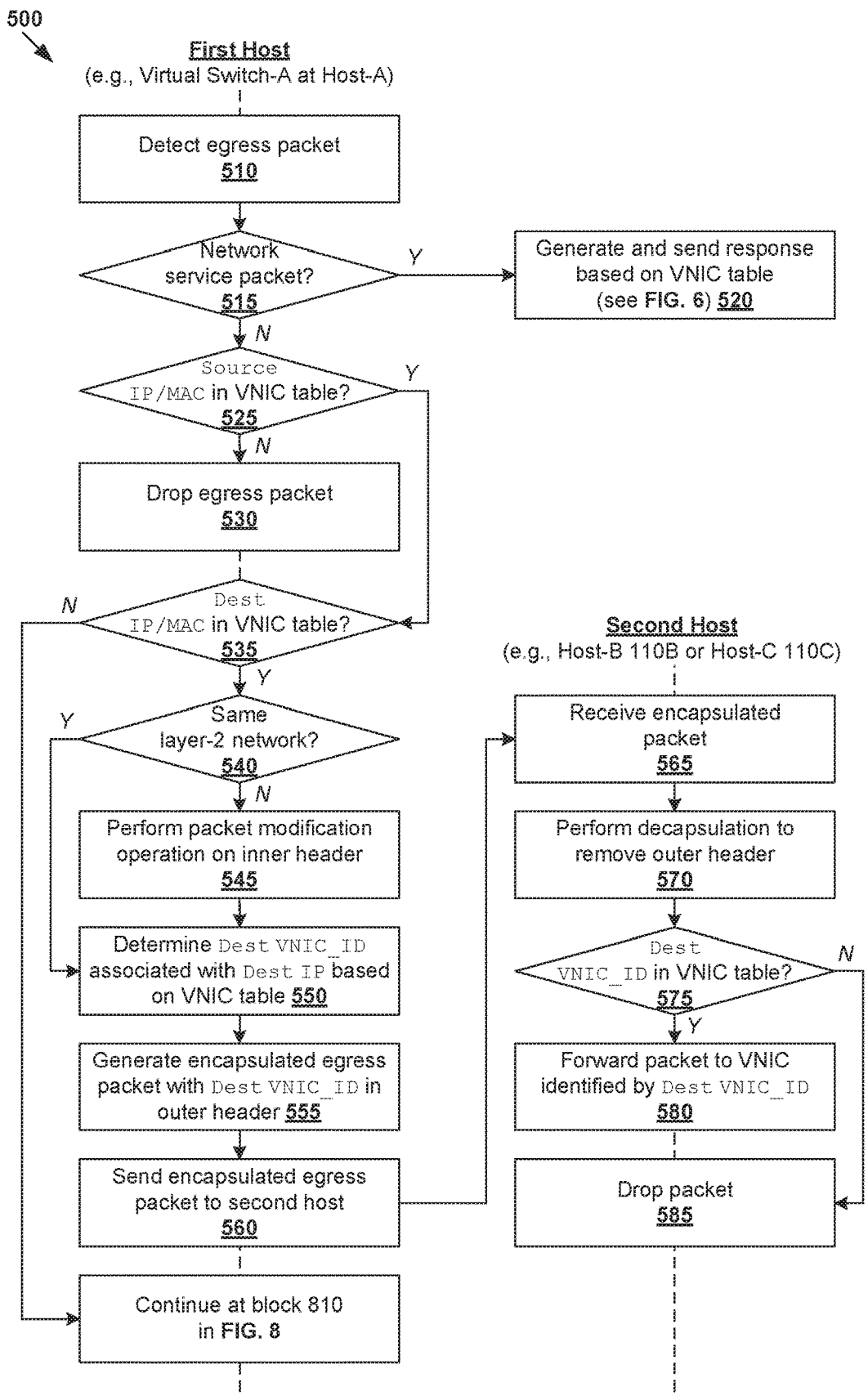
FIG. 5 is a flow diagram of a first example detailed process for packet handling based on virtual network configuration information in an SDN environment.

FIG. 5 is a flow diagram of first example detailed process 500 for packet handling based on configuration information in SDN environment 100. Example process 500 may include one or more operations, functions, or actions illustrated at 510 to 585. The various operations, functions or actions may be combined into fewer blocks, divided into additional blocks, and/or eliminated depending on the desired implementation.

At 510 and 515 in FIG. 5, in response to detecting an egress packet from VM1 131 via VNIC1 141, virtual switch-A 115A determines whether the packet is a network service request. If yes, at 520, virtual switch-A 115A generates and sends a response based on configuration information 421 associated with VNIC1 141 in VNIC table 116A. Otherwise, block 525 is performed.

The network service may be an address assignment service using DHCP, domain name translation service using DNS, address resolution service using ARP, and ping service using ICMP, etc. In practice, any additional and/or alternative network service(s) may be implemented using any suitable protocol(s), such as Neighbor Discovery Protocol (NDP) for IP version 6 (IPv6) addresses instead of ARP for IPv4 addresses, etc. Blocks 510-520 in FIG. 5 will be explained further using FIG. 6, which is a flow diagram of example process 600 for network service packet handling based on virtual network configuration information according to the example in FIG. 5.

(a) DHCP Handling

Figure 6:
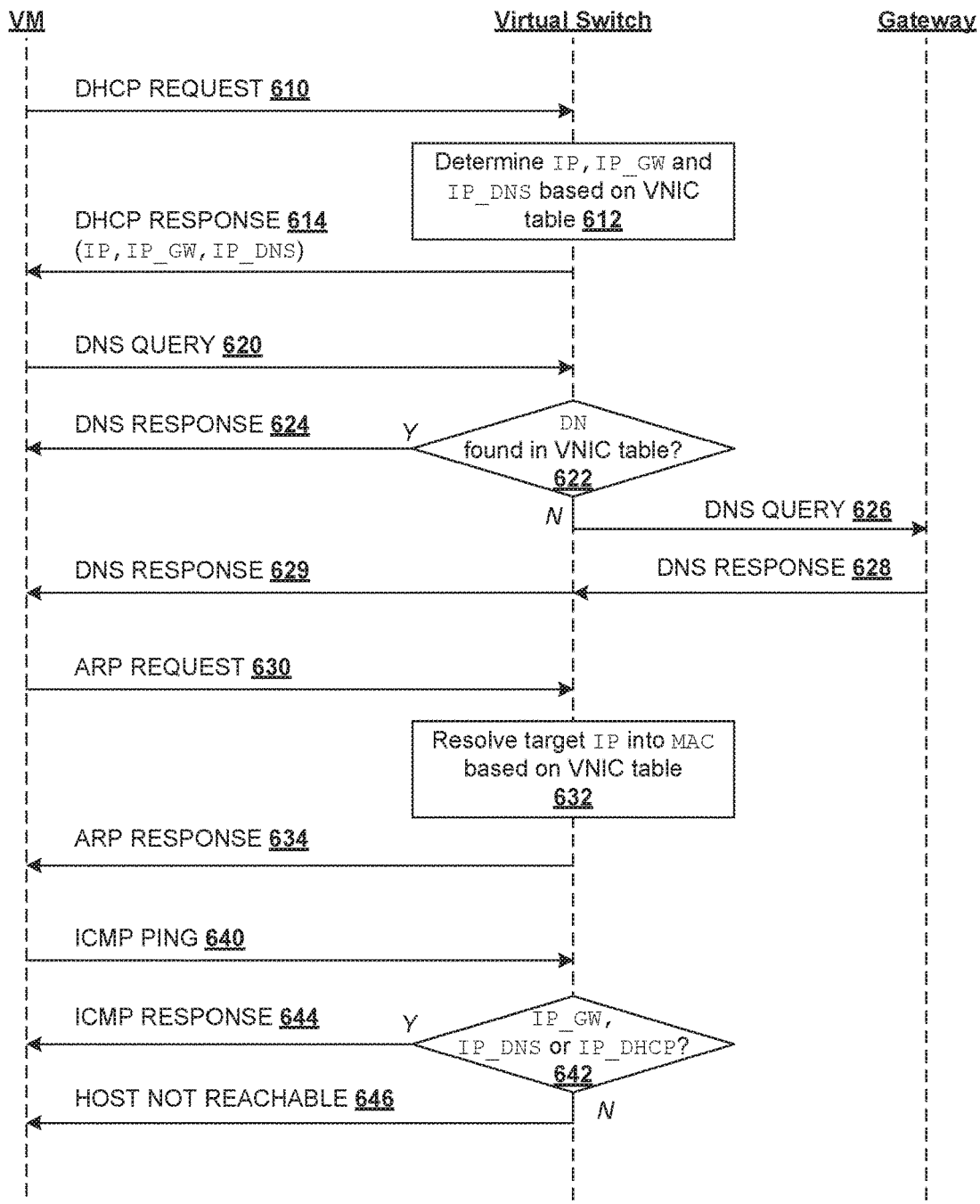
FIG. 6 is a flow diagram of an example process for network service packet handling based on virtual network configuration information according to the example in FIG. 5.

At 610 in FIG. 6, in response to detecting a network service packet in the form of a DHCP request via VNIC1 141, virtual switch-A 115A acts like a DHCP server to provide an address assignment service. In particular, at 612, virtual switch-A 115A determines (IP-1, IP_GW=IP-GW1, IP_DNS=IP-S) associated with VNIC1 141 based on VNIC table 116A (see 421 in FIG. 4). At 614, virtual switch-A 115A generates and sends a DHCP response that includes (IP-1, IP_GW=IP-GW1, IP_DNS=IP-S) to VNIC1 141. This way, it is not necessary to forward the DHCP request to a conventional DHCP server. In practice, the DHCP request and response may be in the form of DHCP Discover and Offer messages.

(b) DNS Handling

DNS is a network service that translates a target domain name into an IP address, or vice versa. At 620 and 622 in FIG. 6, in response to detecting a network service packet in the form of a DNS query via VNIC1 141, virtual switch-A 115A determines whether the target domain name (e.g., DN=dn2.xyz.com) in the DNS query can be found in VNIC table 116A. If yes, at 624 in FIG. 6, virtual switch-A 115A acts like a DNS server by generating and sending a DNS response via VNIC1 141 to VM1 131. For example, based on virtual network configuration information 425 associated with VNIC5 145 in FIG. 4, the DNS response specifies IP=IP-5 associated with DN=dn2.xyz.com.

Otherwise, at 626 in FIG. 6, in response to determination that the domain name (e.g., DN=dn3.abc.com) cannot be found in VNIC table 116A, the DNS request is forwarded to a gateway, which then sends it to an external DNS server (not shown for simplicity). For example, based on virtual network configuration information 421 in VNIC table 116A, virtual switch-A 115A may identify first gateway 161 (see IP_GW=IP-GW1) associated with VNIC1 141. At 628 and 629, in response to receiving a DNS response from the gateway, the DNS response is forwarded via VNIC1 141 to VM1 131.

(c) ARP Handling

ARP is an address resolution protocol that resolves a target IP address into a MAC address. At 630, 632 and 634 in FIG. 6, in response to detecting an ARP request, virtual switch-A 115A resolves a target IP address specified in the ARP request to a MAC address based on VNIC table 116A and responds with an ARP response. In a first example, target IP address=10.1.1.6 associated with VNIC3 143 may be resolved into MAC address=MAC-3 based on virtual network configuration information 423 in FIG. 4. In a second example, the IP address to be resolved may be a logical gateway IP address, such as IP-GW1 associated with gateway MAC address=MAC-GW1.

(d) ICMP Ping Handling

Ping is a utility that can be used to test the reachability of a destination on an IP network. In practice, Ping may be initiated by sending an ICMP echo request. For example, at 640 and 642 in FIG. 6, in response to detecting an ICMP echo request specifying a target IP address, virtual switch-A 115A determines whether the target IP address is a logical gateway IP address (IP_GW), DHCP server IP address (IP_DHCP), or DNS server IP address (IP_DNS). If yes (see 644), an ICMP echo response will be generated and sent, but otherwise (see 646), a 'host not reachable' message is returned. Although not shown in FIG. 6, an ICMP echo request that is destined for a VNIC (e.g., VNIC1 141) may be sent to associated VM (e.g., VM1 131), which responds or ignore the request.

East-West Packet Handling

East-west traffic from one host to another host may be handled based on virtual network configuration information 400 according to blocks 525-585 in FIG. 5. Some examples will be explained using FIG. 7, which is a schematic diagram illustrating example packet handling 700 based on virtual network configuration information according to the example in FIG. 5.

(a) Egress Packet Handling at First Host

At 510, 515 (no) and 525 in FIG. 5, in response to detecting an egress packet that is not a network service packet from VM1 131 via VNIC1 141, hypervisor-A 114A determines whether the source address information (i.e., source IP address and/or source MAC address) in the egress packet can be found in VNIC table 116A. If not found, the egress packet is dropped at block 530 because its source is unknown, but otherwise, a forwarding decision is made as follows.

In a first scenario in FIG. 7, consider a first packet (see 710) with payload 714 and inner IP header 712 that is addressed from source IP address=10.1.1.5 associated with VNIC1 141 and VM1 131 to destination IP address=10.1.1.6 associated with VNIC3 143 and VM3 133. In this case, at 535, virtual switch-A 115A determines that the destination address information (i.e., destination IP and/or MAC) is found in VNIC table 116A. Further, at 540 (yes), virtual switch-A 115A determines that the source IP address and destination IP address are associated with the same layer-2 network=10.0.0.0/8.

In response, at 550, 555 and 560 in FIG. 5, virtual switch-A 115A generates and sends first encapsulated packet 720 to virtual switch-B 115B on host-B 110B. First encapsulated packet 720 includes first packet 710 and outer header 722 specifying destination VNIC ID=103 (see 724) as context information. Compared to an IP address that may be used by different tenants, a VNIC ID provides context or meaning in that it uniquely identifies the corresponding VNICs within SDN environment 100. The destination VNIC ID is retrieved from VNIC table 116A based on destination IP address=10.1.1.6 (i.e., IP-3) associated with VNIC3 143. Based on (IP-1, IP-A) and (IP-3, IP-B) in VNIC table 116A, outer header 722 is configured to include source IP address=IP-A associated with source hypervisor-A 114A, and destination IP address=IP-B associated with destination hypervisor-B 114B. See entries 421, 423 in FIG. 4.

In a second scenario in FIG. 7, consider a second packet (see 730) with payload 734 and inner IP header 732 that is addressed from source IP address=10.1.1.5 associated with VNIC1 141 to destination IP address=12.1.1.2 associated with VNIC5 145. In this case, at 535 (yes) and 540 (no), virtual switch-A 115A determines that the destination IP address is found in VNIC table 116A, but the source IP address and destination IP address are associated with different (pseudo) layer-2 networks=10.0.0.0/8 and 12.1.1.0/8 respectively. In response, at 545, 550 and 555 in FIG. 5, virtual switch-A 115A performs any necessary packet modification on second packet 730 before generating and sending second encapsulated packet 740 to virtual switch-C 115C on host-C 110C.

Depending on the desired implementation, the packet modification at block 545 may involve modifying inner header 732 (see asterisk (*) indicating modification) in second encapsulated packet 740. For example, inner header 732 may be modified to update source MAC address=MAC-1 to a pre-defined router MAC address of a router's logical interface (LIF) and to decrease a time-to-live (TTL) value. Inner header 732 specifies destination MAC address=MAC-5 associated with destination VNIC ID=105 (see 744). Outer header 742 of second encapsulated packet 740 specifies destination VNIC ID=105 (see 744), which is retrieved from VN IC table 116A based on destination IP address=12.1.1.2 associated with VNIC5 145. Based on (IP-1, IP-A) and (IP-5, IP-C) in VNIC table 116A, outer header 742 is configured to include source IP address=IP-A associated with hypervisor-A 114A, and destination IP address=IP-C associated with hypervisor-C 114C on host-C 110C. See entries 421, 425 in FIG. 4.

In a further scenario (not shown for simplicity), both the source and destination may reside on the same host. For example, if the destination VNIC (e.g., VNIC2 142) of an egress packet is associated with the same hypervisor_ID as the source VNIC (e.g., VNIC1 141), virtual switch-A 115A sends the egress packet to the destination VNIC without any encapsulation.

(b) Ingress Packet Handling at Second Host

At 565 and 570 in FIG. 5, in response to receiving first encapsulated packet 720 (i.e., ingress packet) from host-A 110A, virtual switch-B 115B on host-B 110B performs decapsulation to remove outer header 722. Next, at 575 and 580, in response to determination that destination VNIC ID=103 in outer header 722 is found in VNIC table 116B, virtual switch-B 115B forwards decapsulated packet 710 to VM3 133 via VNIC3 143 associated with destination VNIC ID=103. Otherwise, if the destination VNIC ID is not found in VNIC table 116B, the packet will be dropped at block 585.

Similarly, in response to receiving second encapsulated packet 740, virtual switch-C 115C performs decapsulation to remove outer header 742. Further, in response to determination that destination VNIC ID=105 in outer header 742 is found in VNIC table 116C, virtual switch-C 115C forwards decapsulated packet 730 to VM5 135 via VNIC5 145 associated with destination VNIC ID=105. See 565-580 in FIG. 5.

North-South Packet Handling

Figure 8:
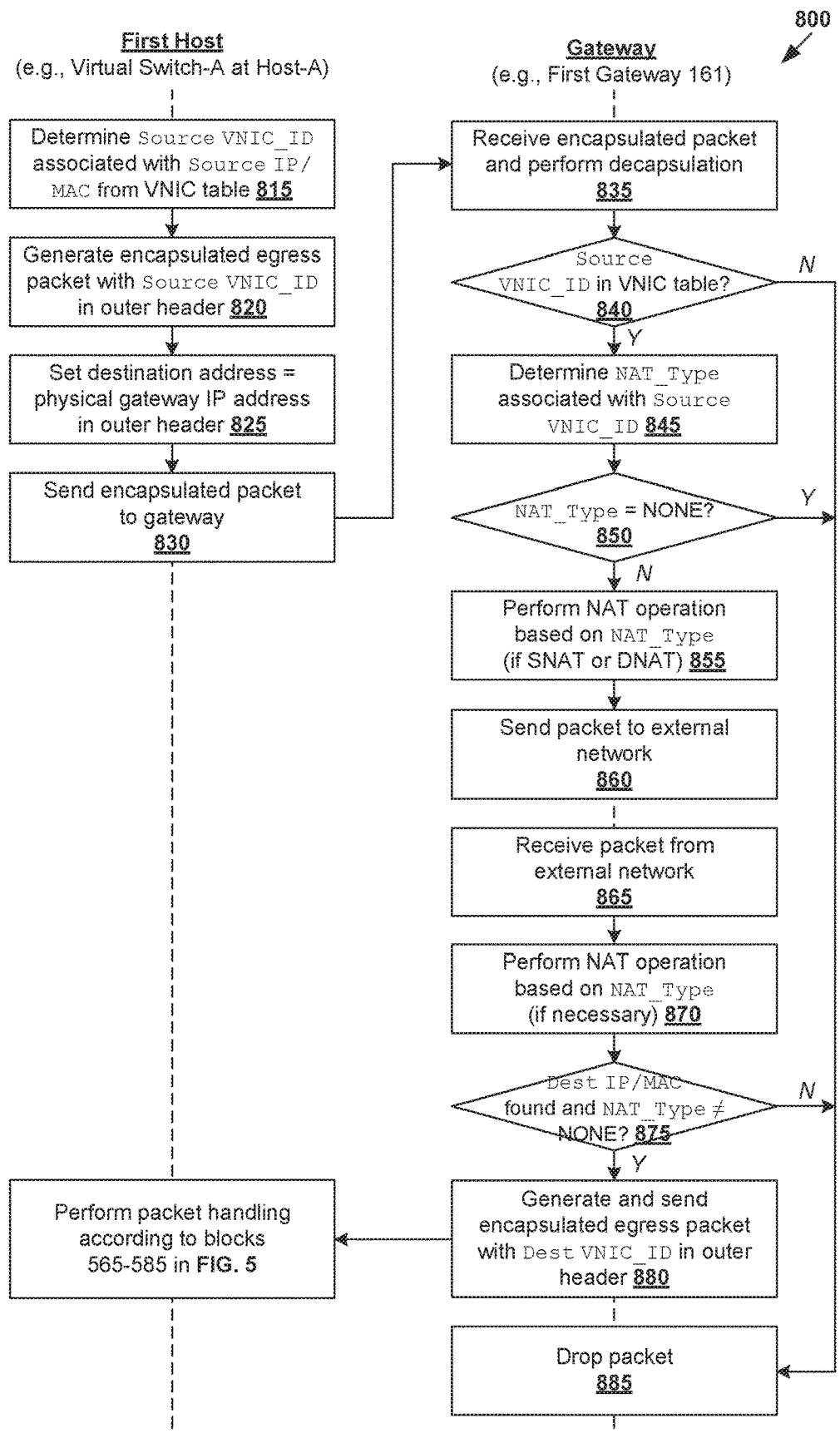
FIG. 8 is a flow diagram of a second example detailed process for packet handling based on virtual network configuration information in an SDN environment.

North-south traffic between a host and external network 106 may be handled based on virtual network configuration information 400. In particular, FIG. 8 is a flow diagram of second example detailed process 800 for packet handling based on virtual network configuration information 400 in SDN environment 100. Example process 800 may include one or more operations, functions, or actions illustrated at 815 to 885. The various operations, functions or actions may be combined into fewer blocks, divided into additional blocks, and/or eliminated depending on the desired implementation.

The example in FIG. 8 will be explained using FIG. 9, which is a schematic diagram illustrating example egress packet handling 900 at gateway 161 based on virtual network configuration information 400 according to the example in FIG. 8. Depending on the desired implementation, gateways 161-163 may be configured to perform north-south packet handling (e.g., across data center boundary), NAT translation, exchange routing information with an external network, etc. For example in FIG. 9, gateways 161-163 may be assigned with respective (physical) IP addresses IP-D, IP-E and IP-F, which are known to hypervisors 114A-C. According to examples of the present disclosure, packet handling may be improved at gateways 161-163 based on virtual network configuration information 400 in VNIC tables 171-173 obtained by respective gateways 161-163 from controller 150.

(a) Egress Packet Handling at Gateway

Figure 9:
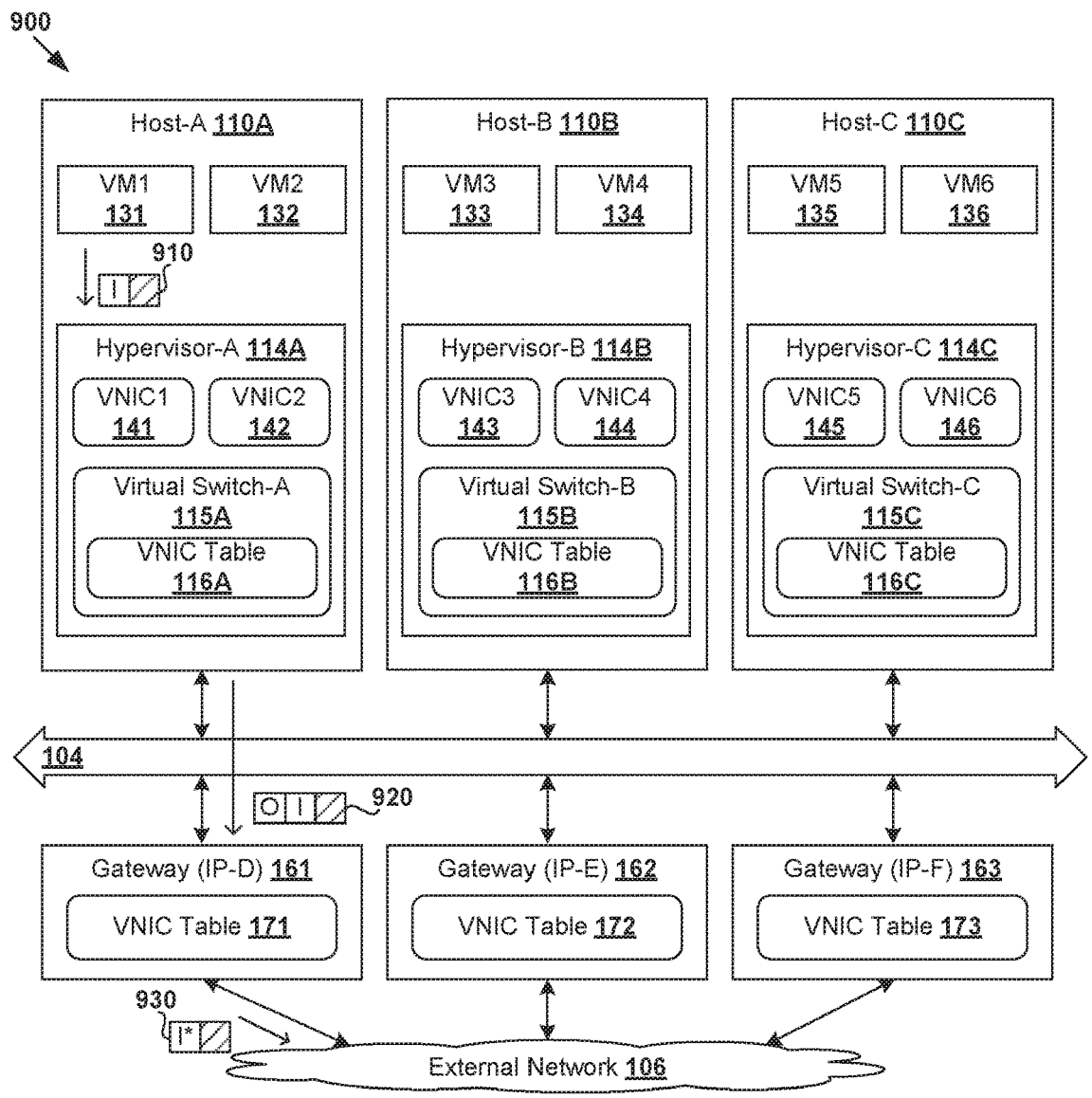
FIG. 9 is a schematic diagram illustrating an example egress packet handling at a gateway based on virtual network configuration information according to the example in FIG. 8.
Figure 10:
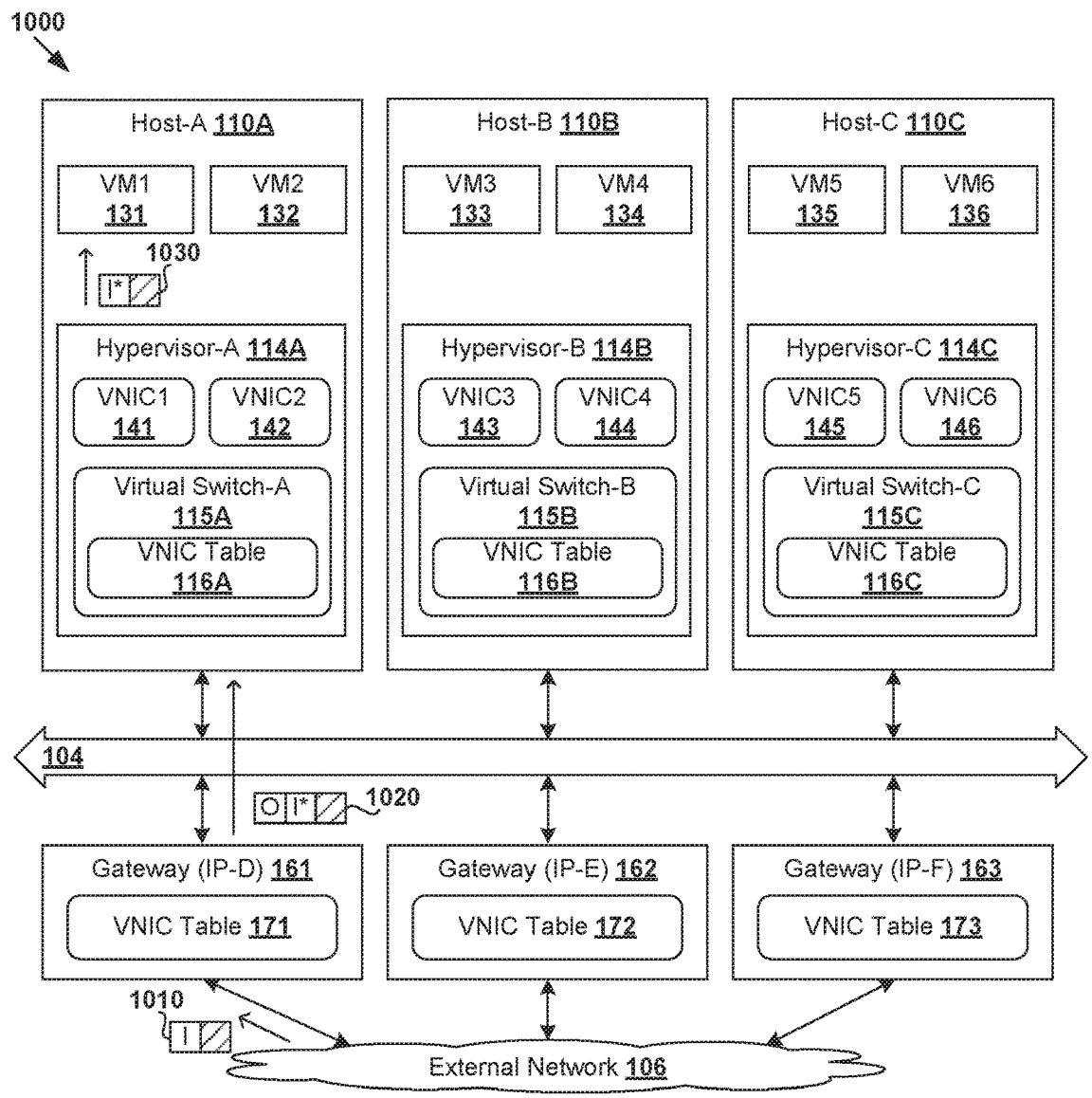
FIG. 10 is a schematic diagram illustrating an example ingress packet handling at a gateway based on virtual network configuration information according to the example in FIG. 8.

Referring first to FIG. 9, consider a third packet (see 910) that is addressed from source IP address=10.1.1.5 associated with VNIC1 141 and VM1 131 to destination IP address=IP-7 (e.g., 8.8.8.8) associated with a destination in external network 106. In this case, since the destination IP address cannot be found in VNIC table 116A according to block 535 in FIG. 5, example process 800 in FIG. 8 is performed.

At 815 in FIG. 8, virtual switch-A 115A determines source VNIC ID=101 associated with source IP address=10.1.1.5 from VNIC table 116A. See corresponding 421 in FIG. 4. Next, at 820, 825 and 830, virtual switch-A 115A generates and forwards third encapsulated packet 920 to first gateway 161. Outer header 922 specifies source VNIC-ID=101 (see 924) from VNIC table 116A, source IP address=IP-A associated with hypervisor-A 114A, and destination IP address=IP-D associated with gateway 161.

At 835 and 840 in FIG. 8, in response to receiving third encapsulated packet 920 from virtual switch-A 115A, gateway 161 performs decapsulation to remove outer header 922, and determines whether source VNIC ID=101 (see 924) in outer header 922 can be found in VNIC table 171 maintained by gateway 161. VNIC table 171 includes virtual network configuration information 400 explained using FIG. 4. If not found, the packet is dropped, but otherwise, gateway 161 continues to block 845.

At 845 in FIG. 8, gateway 161 determines NAT_Type associated with source VNIC ID=101 (see 924) in outer header 922 from VN IC table 171. At 850, in response to determination that the NAT_Type=NONE (i.e., no external communication), the packet is dropped. Otherwise, at 855 and 860, gateway 161 performs any suitable NAT operation(s) defined by NAT_Type (if necessary) before sending decapsulated packet 930 to external network 106. For example, block 855 may involve performing SNAT operation(s) in the case of NAT_Type=SNAT, or DNAT operation(s) in the case of NAT_Type=DNAT. No NAT operation is required when NAT_Type=DIRECT.

For example in FIG. 9, VNIC1 141 is associated with NAT_Type=SNAT and packet 910 is addressed from source IP address=10.1.1.5 and destination IP address=IP-7 (e.g., 8.8.8.8). If packet 910 is the first packet in the flow, gateway 161 generates modified packet 930 by updating a source IP address and a source port number in header 912. For example, source IP address may be updated from IP-1=10.1.1.5 associated with VNIC1 141 to IP-T1=7.7.7.7 associated with Tenant_ID=T1. Source port number (e.g., 100) may be updated to a different source port number (e.g., 70) allocated by gateway 161.

Gateway 161 also updates its local runtime state information to add a new entry (source IP address=10.1.1.5, source port=100, updated source IP address=IP-T1, updated source port=70) associated with the flow. This way, subsequent packets belonging to the same flow will be modified in a similar manner. Modified packet 930 is then sent to external network 106. In practice, gateway 161 may select an uplink to send modified packet 930 based on routing information exchanged with external routers (not shown for simplicity) in external network 106 using any suitable routing protocol, such as Open Shortest Path First (OSPF), Border Gateway Protocol (BGP), Intermediate System to Intermediate System (IS-IS), etc.

(a) Ingress Packet Handling at Gateway

According to examples of the present disclosure, gateways 161-163 may handle ingress packets received from external network 106 based on virtual network configuration information 400 in respective VNIC tables 171-173. An example will be explained using FIG. 8 (blocks 865-885) and FIG. 10, which is a schematic diagram illustrating example ingress packet handling 1000 at gateway 161 based on virtual network configuration information according to the example in FIG. 8.

Continuing at 865 and 870 in FIG. 8, in response to receiving ingress packet 1010 from external network 106, gateway 161 checks its local runtime state information and performs NAT operation(s) if necessary. For example, ingress packet 1010 may include payload 1014 and inner header 1012 specifying source IP address=8.8.8.8 and destination IP address=IP-T1 (e.g., 7.7.7.7). In this case, based on entry (IP-1=10.1.1.5, 100, IP-T1=7.7.7.7, 70) in its local runtime state information, gateway 161 may translate the destination IP address from IP-T1 to IP-1=10.1.1.5 in inner header 1012 (see asterisk in FIG. 10).

At 875 in FIG. 8, gateway 161 determines whether the destination address information (e.g., IP-1=10.1.1.5) of ingress packet 1010 can be found in VNIC table 171, and whether the destination address information is associated with NAT_Type≠NONE. If yes, gateway 161 generates and sends encapsulated packet 1020 at block 880. Otherwise (destination address information not found or NAT_Type=NONE), the packet will be dropped at block 885.

Encapsulated packet 1020 includes outer header 1022 specifying destination VNIC ID=101 (see 1024) associated with VNIC1 141. Based on (IP-1, IP-A) in VNIC table 171, outer header 1024 is configured to include source IP address=IP-D associated with gateway 161, and destination IP address=IP-A associated with destination hypervisor-A 114A on host-A 110A. See corresponding entry 421 in FIG. 4.

At host-A 110A, encapsulated packet 1020 may be handled according to blocks 565-585 in FIG. 5. This involves virtual switch-A 115A performing decapsulation to remove outer header 1024 to generate packet 1030, which is then forwarded to VNIC1 141 associated with destination VNIC ID=101 in outer header 1024. If the destination VNIC ID is not found in VNIC table 116A, the packet will be dropped.

If necessary, gateway 161 may perform DNAT operation(s) at block 870 in FIG. 8. For example, if the destination IP address of a packet from external network 106 is found in the "IP address" (IP) column in VNIC table 171 and NAT_Type=DIRECT, a DNAT operation is not required. If the destination IP address (e.g., 160.1.2.3) is found in the "external IP address" (IP_Ext) column in VNIC table 171 and NAT_Type=DNAT, gateway 161 may perform DNAT operation(s) to update the external IP address (IP_Ext) to an internal IP address (IP) at block 880 in FIG. 8.

Modification(s)

In the above examples, it is assumed that the egress packet detected at block 510 in FIG. 5 is a layer-3 (IP) packet that specifies IP address information. Depending on the desired implementation, the egress packet may be dropped in response to determination that it is not an IP packet before block 525 is performed. Alternatively, the example in FIG. 5 may be modified to handle layer-2 packets. For example, if a destination MAC address in the packet is found in VNIC table 116A, virtual switch-A 115A generates an encapsulated packet and sends it to a hypervisor identified by hypervisor_ID indicated in VNIC table 116A. Otherwise, the packet may be treated as a broadcast unicat multicast (BUM) packet that is sent to all hypervisors associated with the same (pseudo) layer-2 network.

Although discussed using VMs 131-136 and VNICs 141-146, it should be understood that packets may originate from other virtualized computing instances, such as containers, etc. As used herein, the term "container" (also known as "container instance") is used generally to describe an application that is encapsulated with all its dependencies (e.g., binaries, libraries, etc.). For example, multiple containers may be executed as isolated processes inside VM1 131, where a different VNIC is configured for each container. Each container is "OS-less", meaning that it does not include any OS that could weigh 10s of Gigabytes (GB). This makes containers more lightweight, portable, efficient and suitable for delivery into an isolated OS environment. Running containers inside a VM (known as "containers-on-virtual-machine") not only leverages the benefits of container technologies but also that of virtualization technologies.

Any suitable troubleshooting or other diagnostics mechanisms may be implemented in SDN environment 100, such as existing layer-2 and/or layer-3 troubleshooting measures. Examples include packet capture inside a VM's guest OS, layer-2 port mirroring, Internet Protocol Flow Information Export (IPFIX) approaches, etc. In general, when users (e.g., network administrators) notice a network abnormality in SDN environment 100, they may check the virtual network configuration information at controller 150, etc. If the virtual network configuration information is correct, this may indicate a system defect, physical network issue, etc. Troubleshooting may also involve checking if hosts 110A-C and/or gateway 161-163 have obtained the correct virtual network configuration information from controller 150. If yes, troubleshooting may be performed on data path 104 depending on the different hypervisor platforms or virtualization technologies implemented by hypervisors 114A-C, such as VMware ESX® or ESXi™ (available from VMware Inc.), Kernel-based Virtual Machine (KVM) from Red Hat Enterprise, etc. For example, in the case of ESXi, this may involve dumping kernel forwarding information base (FIB) or using tools such as packet trace, etc. In the case of KVM, flow examination may be performed.

In practice, examples of the present disclosure may be implemented together with other functionalities, such as nested virtual networks, hardware virtual tunnel endpoint (VTEP) integration, firewall and load balancer integration, etc.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NICs) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 10. For example, computer systems capable of acting as respective hosts 110A-C, controller 150 and gateways 161-163 may be deployed in SDN environment 100 to implement the examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first host to perform packet handling based on virtual network configuration information in a software-defined networking (SDN) environment that includes the first host and a second host, wherein the method comprises:
   obtaining, from a network management entity, virtual network configuration information that specifies a first virtual object identifier (ID) in the form of a first virtual network interface controller (VNIC) ID and a first address associated with a first virtualized computing instance supported by the first host, and a second virtual object ID in the form of a second virtual network interface controller (VNIC) ID and a second address associated with a second virtualized computing instance supported by the second host, wherein the first VNIC ID identifies a first VNIC associated with the first virtualized computing instance, and the second VNIC ID identifies a second VNIC associated with the second virtualized computing instance in the SDN environment; and
   in response to detecting, from the first virtualized computing instance, an egress packet with an inner header that is addressed from the first address to the second address specified in the virtual network configuration information,
      generating an encapsulated packet by encapsulating the egress packet with an outer header that specifies the second virtual object ID; and
      sending the encapsulated packet to the second host to cause the second host to decapsulate the outer header and, based on the second virtual object ID in the outer header, send the egress packet to the second virtualized computing instance.

2. The method of claim 1, wherein obtaining the virtual network configuration information comprises:
   receiving, from the network management entity, the virtual network configuration information that specifies the first VNIC ID and the first address based on the network management entity identifying that first VNIC is activated on the first host; and
   receiving, from the network management entity, the virtual network configuration information that specifies the second VNIC ID and the second address based on the network management entity identifying that the second VNIC is activated on the second host, and both the first VNIC and second VNIC are associated with a same tenant.

3. The method of claim 1, wherein the method further comprises:
   detecting, from the first virtualized computing instance, a further packet that includes an inner header addressed from the first address to a third address that is not specified in the virtual network configuration information;
   generating a further encapsulated packet by encapsulating the further packet with an outer header that specifies the first virtual object ID; and
   sending the further encapsulated packet to a gateway to cause the gateway to decapsulate the outer header, perform a network address translation (NAT) operation associated with the first virtual object ID, and forward a decapsulated packet to an external network.

4. The method of claim 1, wherein generating the encapsulated packet comprises:
   determining whether the first address and the second address are associated with a same layer-2 network, or different layer-2 networks; and
   in response to determination that the first address and the second address are associated with different layer-2 networks, performing a packet modification operation to modify the inner header of the egress packet.

5. The method of claim 1, wherein the method further comprises:
   in response receiving, from the second host or a gateway, an encapsulated packet that includes an outer header specifying the first virtual object ID, performing decapsulation to remove the outer header and sending a decapsulated packet to the first virtualized computing instance based on the first virtual object ID.

6. The method of claim 1, wherein the method further comprises:
   detecting, from the first virtualized computing instance, a request for a network service, wherein the request is one of the following: Dynamic Host Control Protocol (DHCP) request, Domain Name Server (DNS) query, address resolution request and ping request; and
   generating and sending a response to the first virtualized computing instance based on the virtual network configuration information.

7. A non-transitory computer-readable storage medium that includes a set of instructions which, in response to execution by a processor of a first host, cause the processor to perform a method of packet handling based on virtual network configuration information in a software-defined networking (SDN) environment that includes the first host and a second host, wherein the method comprises:
   obtaining, from a network management entity, virtual network configuration information that specifies a first virtual object identifier (ID) in the form of a first virtual network interface controller (VNIC) ID and a first address associated with a first virtualized computing instance supported by the first host, and a second virtual object ID in the form of a second virtual network interface controller (VNIC) ID and a second address associated with a second virtualized computing instance supported by the second host, wherein the first VNIC ID identifies a first VNIC associated with the first virtualized computing instance and the second VNIC ID identifies a second VNIC associated with the second virtualized computing instance in the SDN environment; and in response to detecting, from the first virtualized computing instance, an egress packet with an inner header that is addressed from the first address to the second address specified in the virtual network configuration information, generating an encapsulated packet by encapsulating the egress packet with an outer header that specifies the second virtual object ID; and sending the encapsulated packet to the second host to cause the second host to decapsulate the outer header and, based on the second virtual object ID in the outer header, send the egress packet to the second virtualized computing instance.

8. The non-transitory computer-readable storage medium of claim 7, wherein obtaining the virtual network configuration information comprises:

receiving, from the network management entity, the virtual network configuration information that specifies the first VNIC ID and the first address based on the network management entity identifying that first VNIC is activated on the first host; and receiving, from the network management entity, the virtual network configuration information that specifies the second VNIC ID and the second address based on the network management entity identifying that the second VNIC is activated on the second host, and both the first VNIC and second VNIC are associated with a same tenant.

9. The non-transitory computer-readable storage medium of claim 7, wherein the method further comprises:

detecting, from the first virtualized computing instance, a further packet that includes an inner header addressed from the first address to a third address that is not specified in the virtual network configuration information;

generating a further encapsulated packet by encapsulating the further packet with an outer header that specifies the first virtual object ID; and sending the further encapsulated packet to a gateway to cause the gateway to decapsulate the outer header, perform a network address translation (NAT) operation associated with the first virtual object ID, and forward a decapsulated packet to an external network.

10. The non-transitory computer-readable storage medium of claim 7, wherein generating the encapsulated packet comprises:

determining whether the first address and the second address are associated with a same layer-2 network, or different layer-2 networks; and in response to determination that the first address and the second address are associated with different layer-2 networks, perform a packet modification operation to modify the inner header of the egress packet.

11. The non-transitory computer-readable storage medium of claim 7, wherein the method further comprises:

in response receiving, from the second host or a gateway, an encapsulated packet that includes an outer header specifying the first virtual object ID, performing decapsulation to remove the outer header and sending a decapsulated packet to the first virtualized computing instance based on the first virtual object ID.

12. The non-transitory computer-readable storage medium of claim 7, wherein the method further comprises:

detecting, from the first virtualized computing instance, a request for a network service, wherein the request is one of the following: Dynamic Host Control Protocol (DHCP) request, Domain Name Server (DNS) query, address resolution request and ping request; and generating and sending a response to the first virtualized computing instance based on the virtual network configuration information.

13. A host, being a first host, configured to perform packet handling based on virtual network configuration information in a software-defined networking (SDN) environment that includes the first host and a second host, wherein the host comprises:

a processor; and a non-transitory computer-readable medium having stored thereon instructions that, when executed by the processor, cause the processor to:

obtain, from a network management entity, virtual network configuration information that specifies a first virtual object identifier (ID) in the form of a first virtual network interface controller (VNIC) ID and a first address associated with a first virtualized computing instance supported by the first host, and a second virtual object ID in the form of a second virtual network interface controller (VNIC) ID and a second address associated with a second virtualized computing instance supported by the second host, wherein the first VNIC ID identifies a first VNIC associated with the first virtualized computing instance and the second VNIC ID identifies a second VNIC associated with the second virtualized computing instance in the SDN environment; and in response to detecting, from the first virtualized computing instance, an egress packet with an inner header that is addressed from the first address to the second address specified in the virtual network configuration information, generate an encapsulated packet by encapsulating the egress packet with an outer header that specifies the second virtual object ID; and send the encapsulated packet to the second host to cause the second host to decapsulate the outer header and, based on the second virtual object ID in the outer header, send the egress packet to the second virtualized computing instance.

14. The host of claim 13, wherein the instructions for obtaining the virtual network configuration information further cause the processor to:

receive, from the network management entity, the virtual network configuration information that specifies the first VNIC ID and the first address based on the network management entity identifying that first VNIC is activated on the first host; and receive, from the network management entity, the virtual network configuration information that specifies the second VNIC ID and the second address based on the network management entity identifying that the second VNIC is activated on the second host, and both the first VNIC and second VNIC are associated with a same tenant.

15. The host of claim 13, wherein the instructions further cause the processor to:

detect, from the first virtualized computing instance, a further packet that includes an inner header addressed from the first address to a third address that is not specified in the virtual network configuration information;

generate a further encapsulated packet by encapsulating the further packet with an outer header that specifies the first virtual object ID; and send the further encapsulated packet to a gateway to cause the gateway to decapsulate the outer header, perform a network address translation (NAT) operation associated with the first virtual object ID, and forward a decapsulated packet to an external network.

16. The host of claim 13, wherein the instructions for generating the encapsulated packet comprises:

determine whether the first address and the second address are associated with a same layer-2 network, or different layer-2 networks; and in response to determination that the first address and the second address are associated with different layer-2 networks, perform a packet modification operation to modify the inner header of the egress packet.

17. The host of claim 13, wherein the instructions further cause the processor to:

in response receiving, from the second host or a gateway, an encapsulated packet that includes an outer header specifying the first virtual object ID, perform decapsulation to remove the outer header and send a decapsulated packet to the first virtualized computing instance based on the first virtual object ID.

18. The host of claim 13, wherein the instructions further cause the processor to:

detect, from the first virtualized computing instance, a request for a network service, wherein the request is one of the following: Dynamic Host Control Protocol (DHCP) request, Domain Name Server (DNS) query, address resolution request and ping request; and generate and send a response to the first virtualized computing instance based on the virtual network configuration information.

* * * * *